United States Patent [19]

Desmons

[11] Patent Number: 5,263,166
[45] Date of Patent: Nov. 16, 1993

[54] TECHNIQUE OF PROGRAMMING INTEGRATED CIRCUIT CONTROL REGISTERS

[75] Inventor: Dimitri C. Desmons, Campbell, Calif.

[73] Assignee: Zilog, Inc., Campbell, Calif.

[21] Appl. No.: 753,729

[22] Filed: Sep. 3, 1991

[51] Int. Cl.$^5$ .............................................. G06F 13/00
[52] U.S. Cl. .............................. 395/775; 364/DIG. 1
[58] Field of Search .............................. 395/775, 800;
364/228.5, 229.4, 230, 228.4, 978.1, 978.2,
249.2, 256.4, 252.6, 262.4, 280.9, 925.5, 947.6,
247.6, 255.4

[56] References Cited

U.S. PATENT DOCUMENTS

| | | | |
|---|---|---|---|
| 4,122,519 | 10/1978 | Bielawski | 364/262.4 |
| 4,204,253 | 5/1980 | Hanenberg et al. | 364/256.4 |
| 4,485,455 | 11/1984 | Boone et al. | 364/925.5 |

OTHER PUBLICATIONS

"Z16C30/Z16C33 CMOS USC/MUSC TM Universal Serial Controller", Technical Manual, Zilog, Inc., Mar. 1990.

"ETM TM :Electronic Technical Manual", User's Manual from Zilog, Inc., 1990.

"ETM Operation Guide", Salesperson's Guide, Zilog, Inc., Jan. 25, 1991.

*Primary Examiner*—Dale M. Shaw
*Assistant Examiner*—Moustafa M. Meky
*Attorney, Agent, or Firm*—Majestic, Parsons, Siebert & Hsue

[57] ABSTRACT

A method and system for determining the bit patterns to be loaded into control registers of a specific electronic integrated circuit, including a computer software tool which accesses a table of register field bit pattern alternatives that can be loaded into the circuit in order to cause the it to operate in a selected manner. This table also contains English descriptors for each of the field choices so that the user may easily select the desired bit pattern for each field in order. Functional variables for a certain class of integrated circuits, such as those which operate as communications controllers, for example, are individually mapped into various control register fields in order that the computer system designer is led through the specific register choices which must be made so that one particular integrated circuit of this class will carry out the desired functions.

9 Claims, 6 Drawing Sheets

Microfiche Appendix Included
(329 Microfiche, 4 Pages)

TECHNIQUE OF PROGRAMMING INTEGRATED CIRCUIT CONTROL REGISTERS

BACKGROUND OF THE INVENTION

This invention relates generally to the adaptation of integrated circuit chips for use as part of a particular computer system, and, more specifically, to the configuration of registers internal to integrated circuit chips.

Early microcomputer systems commercialized in the 1970s included a microprocessor (CPU) as one integrated circuit chip, and then a number of additional integrated circuit chips which were dedicated to work with the microprocessor and each other. These separately packaged chips were commonly carried by a printed circuit board to form the electronic core of the microcomputer. In addition to memory chips, these other chips were dedicated to various functions such as a disk controller, graphics controller, communications controller, display interface, coprocessor, and the like.

Currently, the electronic core of a microcomputer is configured generally in the same way, with a plurality of packaged integrated circuit chips interconnected on a mother printed circuit board, but many of the current chips are configurable by the system designer for use with various different computer systems. An example is a universal serial controller product of Zilog, Inc., assignee of the present application, which functions to interconnect a communications line, such as one which may connected to a modem external of the computer system, with the bus of the computer system. This integrated circuit chip contains a number of internal control registers which are loaded with control bits through pins of the circuit package. Individual fields of one or more bits each have specified control functions, such as designating whether the controller chip is to be used with an 8- or 16-bit bus, whether that bus is multiplexed or not, the protocol of communications with the chip, and so forth. The single chip product can thus be configured by system designers for use with a number of different specific microprocessors and systems. It is thus unnecessary to maintain a large inventory of the same controller product for use in all the different environments in which it can be utilized.

In order to provide a maximum universality of the Zilog controller integrated circuit chip mentioned above, over 100 different control fields are contained in 33 16-bit volatile memory registers. The register location and address of each of these fields is identified in a Technical Manual published by Zilog, Inc. for its parts nos. Z16C30/Z16C33, dated March, 1990, which Manual is expressly incorporated herein by this reference. This Manual provides the information of the part that is necessary for a computer system designer to be able to specify the control register contents that are required for the part to operate in a particular system for which it is intended. The manual is used, generally, by reference to each control field, one at a time, and selecting from the available choices for a given field the bit patterns which are desired to be loaded into it. Once the contents of all the control registers are specified, these choices are then incorporated into the system software so that they are loaded to the part's control registers each time the computer system is initialized for operation.

As a result of a desire to increase the versatility of an individual integrated circuit part, the number of such control fields and registers is increasing. It is a very large, time-consuming task to select the contents of so many register fields. Therefore, it is a primary object of the present invention to provide tools for making this task less onerous.

SUMMARY OF THE INVENTION

This and additional objects are accomplished by the present invention wherein, briefly and generally, a software product is provided for use on personal computers to generate the computer program that is necessary as part of a computer system's initialization software to load the control registers. The result is the same as now obtained by hand selection of the control bits of each field, one at a time, but is accomplished in far less time and with more surety. English language descriptors of the choices for each register field are displayed on the screen from which the system designer can select. The proper bit pattern to configure the register field according to the selected descriptor is automatically written into an output file to build up the contents of the registers which are later used to develop the initialization program.

As an additional tool, high level functional choices are presented to the system designer, who is then led by the software to each of the register fields which must be set in order to implement the chosen function. These functional choices are made to be independent of any specific integrated circuit part, but rather quite generally define the functions performed by a class of parts, such as serial communications controller manufactured by several different manufactures, for example. The software is then limited to a particular part of that class, such as the Zilog part identified above, since it is its registers whose contents are being formed by the use of the software. This functional approach requires less knowledge of the specific integrated circuit part being programmed since the software leads the designer one at a time, in the proper order, through various high level choices with descriptors of them. In response to each such choice being made, the contents of one or more register fields necessary to implement the choice is automatically designated and stored.

Such a software design tool is available from Zilog, Inc. and includes an Electronic Technical Manual User's Guide and an ETM Operation Guide, which are incorporated herein by this reference, for the universal serial controller peripheral integrated circuit part being discussed herein as an example of the application of the present invention.

Additional objects, advantages, and features of this present invention will become apparent from the following description of its preferred embodiment, which description should be taken in conjunction with the accompanying drawings.

DESCRIPTION OF A PREFERRED EMBODIMENT

Figure 1:
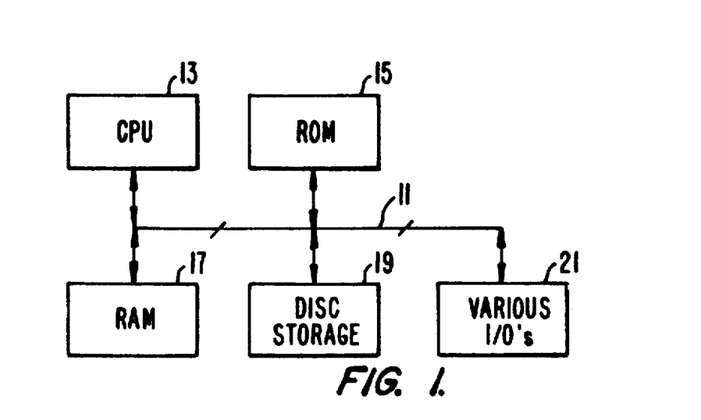
FIG. 1 generally illustrates in block diagram form a computer system in which the software tools of the present invention operate.

Referring initially to FIG. 1, a commonly used personal computer is illustrated in general functional blocks. Commercially available microcomputer systems include a system bus 11 over which a number of functional components communicate with each other. One such component is a microprocessor ("CPU") 13, another a read only memory ("ROM") 15, a random access memory ("RAM") 17, one or more disk storage sub-systems 19, and various input/output devices 21, including a computer monitor and keyboard. It is such general purpose hardware with which the computerized design tools described below can be implemented. It is an advantage that no specialized hardware is required.

Figure 2:
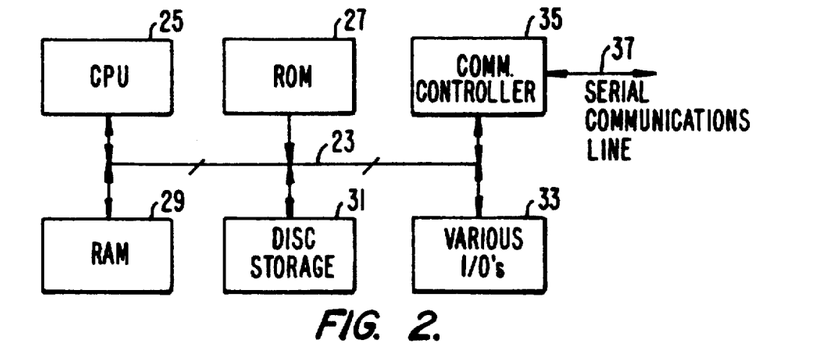
FIG. 2 generally shows in block diagram form a computer system utilizing an integrated circuit chip part whose registers have been configured by use of the design tools of the present invention implemented on the general computer system of FIG. 1.

Referring to FIG. 2, a different computer system is illustrated. It, too, has a system bus 23, a CPU 25, a ROM 27, a RAM 29, one or more disk storage sub-systems 31, and various input/output devices 33, but, in addition, includes a universal peripheral integrated circuit part 35 having control registers which need to be configured. An example of a peripheral part 35 is the universal serial controller, available from Zilog, Inc., as mentioned above. In addition to serial communications controllers, examples of such configurable parts include parallel communications controllers, various types of disk drive controllers, graphics controllers, and the like. In the example of FIG. 2, the communications controller 35 interconnects the computer system bus 23 with a serial communications line 37, and functions to control the communication of data back and forth therebetween. The serial communications line 37 can, for example, be connected with a telephone modem (not shown) or other device utilizing data from the computer system in serial form.

Figure 3:
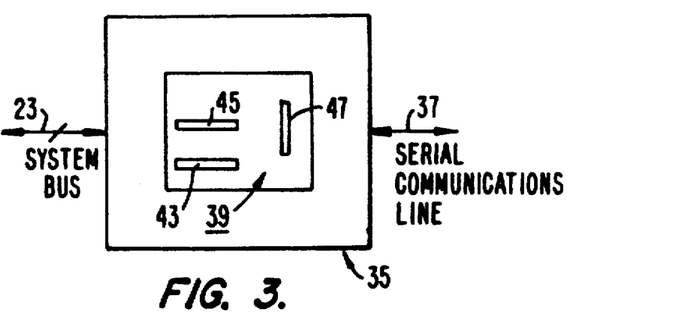
FIG. 3 shows an example peripheral chip which is being configured for use in the computer system of FIG. 2.
Figure 4:
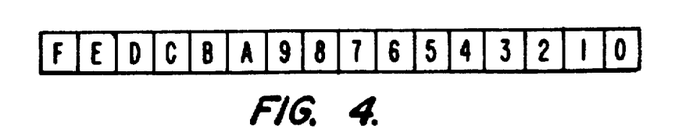
FIG. 4 generally illustrates a configuration of a register of the integrated circuit part of FIG. 3.

FIG. 3 illustrates generally such a communications controller 35. A principal component, and in some cases, the only component, is a packaged integrated circuit part 39, such as the above-discussed part available from Zilog, Inc. Internal to the circuit formed on a silicon chip are a plurality of control registers, such as registers 43, 45, and 47. Each of these registers includes a number, such as sixteen, of single bit volatile memory cells that are programmable through pins of the part 39. Such a 16-bit register is illustrated in FIG. 4, showing identifying nomenclature used herein to identify the bit locations of the registers within the part 39 that must be loaded with appropriate values to configure the part consistent with parameters and limitations of the specific computer system of FIG. 2 in which it is to be utilized.

Figure 5:
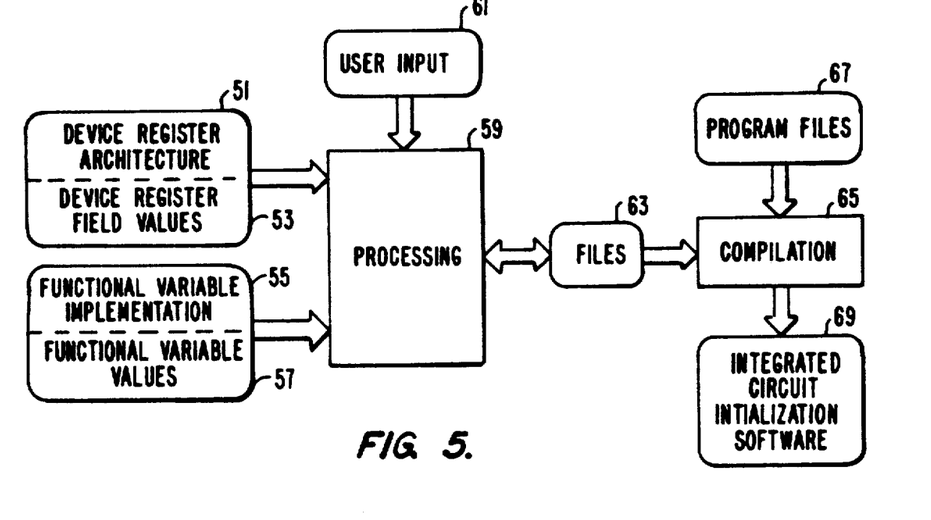
FIG. 5 generally shows the overall structure of a computer software program for implementing the design tools of the present invention.

FIG. 5 shows a general flow diagram of a computer implemented that generates a set of commands for loading the registers of the integrated circuit part 39 with desired initial values. Two data files 51 and 53 define the characteristics and functions of the registers in the device to be initialized. The data file 51 identifies the registers, its individual fields, provides an English language identification of each field, specifies whether a read-write, read only, or write only type field, whether its use is conditioned upon some other field being programmed to a particular state, and similar matters. The data file 53 lists, for each register field identified in data file 51, the bit pattern possibilities for each field as well as an English descriptor of the setting accomplished by each possible bit pattern combination. The information recorded in the data files 51 and 53 is a description of the integrated circuit part whose initial register values are to be initialized. These definitions are provided in manuals by manufacturers of the integrated circuit part, but are reformulated into the two files 51 and 53. The technical manual of Zilog, Inc. mentioned above for its universal serial controller part is an example.

Two other data files 55 and 57 are derived from this same information, but are expressed at a higher, more general level. The data file 55 contains a list and characteristics of a small number, such as 10-15, high level functional variables of the part to be initialized. The functional variables include selecting the microprocessor with which the part is to be used, whether the system bus is 16 or 32 bits wide, and similar very general configuration parameters. The data file 57 provides the possibilities for each of these general functional variables, one of which is selected by the user for each functional variable. Once that selection is made, the software then automatically specifies some register field values where there is no choice in order to cause the part to function as selected, and leads the user through a limited number of choices for other fields that can be made and still implement the function. The data file 55 includes a decision tree which prompts the user to make the appropriate decisions.

The primary processing is indicated in FIG. 5 by a block 59, the user input 61 to that processing also being indicated. This processing is described in more detail below with respect to FIGS. 7-10. The result of the processing includes one or more files 63, which are also described in detail below. These files include a list of commands that have been generated for loading the registers of the given integrated circuit part with desired initial values. These commands are then compiled, in a step indicated at 65, in combination with similar material 67 for other integrated circuit parts that are included in a given computer system. A result 69 is a compiled software routine that loads the registers of integrated circuit parts of a given computer system upon system initialization.

Figure 6:
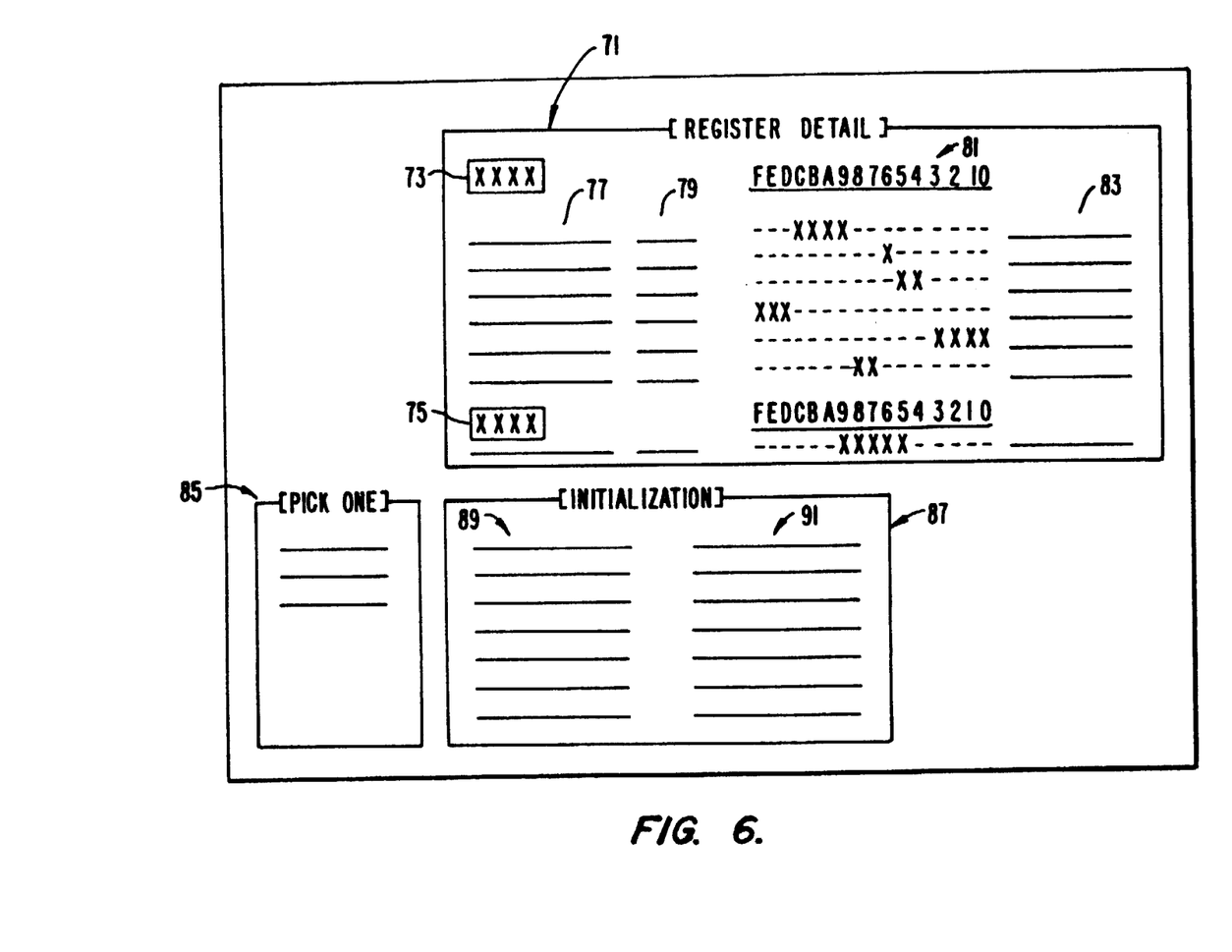
FIG. 6 shows an example computer screen generated by the software of FIG. 5.

Before proceeding to describe details of the processing 59, it can be of assistance in understanding that processing to first review a computer screen display that the user views when interacting with the software. An example screen is illustrated in FIG. 6. Three principal areas of display or windows are shown. A first window 71 provides a listing of all device register fields and their current values. A shorthand representation 73 of one register is provided, with each of its fields indicated in separate lines under it, a second register indication 75 for the next, and so forth. All of the registers and fields are viewable by scrolling the display through the window 71. A column 77 provides descriptors of each field as contained in the part data file 51. A column 79 displays whether each field is a read/write, read only, or write only type field. A next area 81 contains a separate column for each of the bit positions 0 through F of the typical register.

Using the example of FIG. 6, the first field of the register being displayed is designated to contain certain bits in bit positions 9 through C, the next field a single bit in bit position 6, and so forth. Each of the "X" locations of FIG. 6 contain either a 1 or a 0, corresponding to the current value of that particular register bit in the initialization routine being developed. The data file 53 contains initial, default values for each of the field bits, but these change on the display in the window 71 as the user makes certain choices. This displayed information comes from one of the files 63 (FIG. 5). A column 83 provides, for each field being displayed, a descriptor of the function being implemented by the particular bit pattern in that file as displayed in the area 81.

A second window 85 displays choices which are available to the user. For example, in one mode of operation, if a particular line of information in the window 71, representing one register field, is high-lighted, the area 85 will display the functional choices available for that field. The user then points to a choice and the bit pattern in the highlighted line in the window 71 automatically goes to that pattern and the descriptive term in the column 83 becomes that chosen from the list in the window 85.

The above sequence occurs if the selected register field is accessible. The data file 51 includes the conditions under which each register field is accessible, some of them being accessible only if other fields are set to certain values. If a field is currently inaccessible, it is still displayed in the window 71 but in a manner that makes it clear to the user that it is inaccessible. If the user tries to change the value of an inaccessible field, nothing happens.

As an alternative to the ability to select the contents of the register field by picking one of the descriptors in the window 85, the bit pattern can be typed directly into the field space 81 of the window 71. When this occurs, the appropriate descriptor for that bit pattern is then displayed in column 83 of window 71. This is obtained directly from the field value data file 53.

In order to be able to program the registers one at a time, the user must know a great deal about the part to be programmed. A significant advance of the present invention is provision of the functional variables of data files 55 and 57 that allow the user to operate at a higher level. The user will usually choose to designate the contents of the register fields by use of these functional variables. A third window 87 is provided in a display example of FIG. 6, showing a column 89 listing the functional variables for the part and a column 91 that designates opposite each variable the selection that has been made by the user. When a particular functional variable, such as the width of the system bus, is high-lighted in column 89 of window 87, the choices available to the operator are given in the window 85. Once one of those choices is pointed to and selected, the selected function is then displayed in column 91 opposite the functional variable statement. For example, if the user designates from the window 85 that a 16-bit bus is being used in the system, that will show in the column 91 opposite the bus width functional variable. The software automatically designates the contents of one or many register fields. A software tree, to be described below, then prompts the user to make choices among other fields that are necessary to implement the chosen function.

Figure 7:
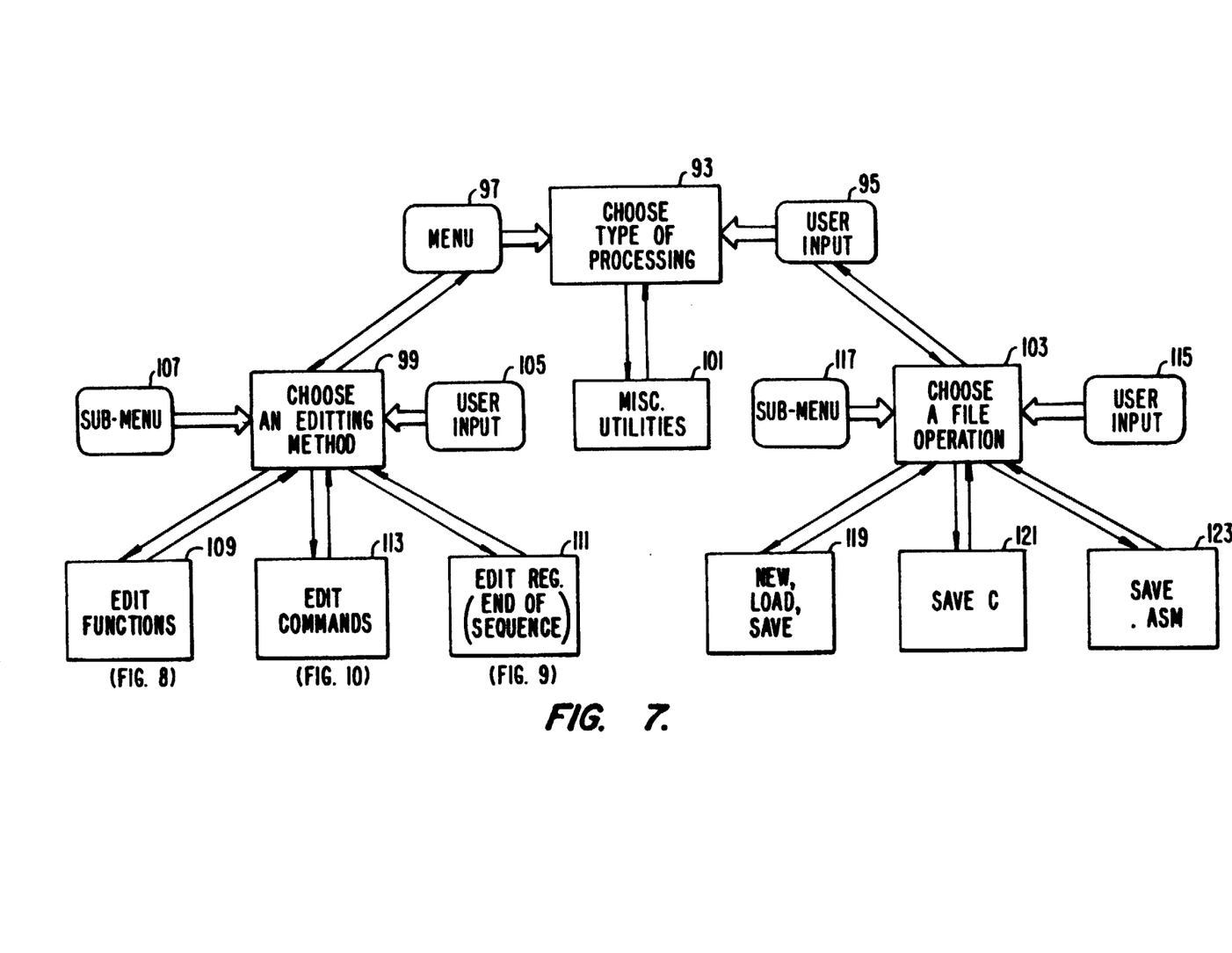
FIG. 7 is a general diagram illustrating the processing of the software of FIG. 5.

The computer implemented processing 59 of FIG. 5 which provides the user interface described with respect to FIG. 6 is diagrammatically represented in FIG. 7. A first operation 93 allows a user input 95 in response to a displayed menu 97 to select one of three types of processing, editing 99, utility functions 101 or file operations 103. If editing 99 is chosen, user input 105 in response to a submenu 107 then selects among three editing operations. One choice 109 is to use the high level functional variables described above to appear in window 87 of the FIG. 6 display. A second choice 111 is to edit the registers directly in window 71 of FIG. 6. A third choice 113 allows editing the resulting initialization commands directly. Each of these three processes 109, 111 and 113 is described below with respect to respective FIGS. 8, 9 and 10.

If the file operation 103 is chosen, a user input 115 chooses from a submenu 117 the desired operation. An operational block 119 indicates the ability to create a new file, to load into memory a file previously saved on disk, the ability to save a file on disk that has been created in the computer memory, and similar functions. Another choice 121 is to save a resulting initialization command file in the C language, the most popular language in which a part's initialization software is expressed. Another alternative 123 is to save such a file in assembly language.

Figure 8:
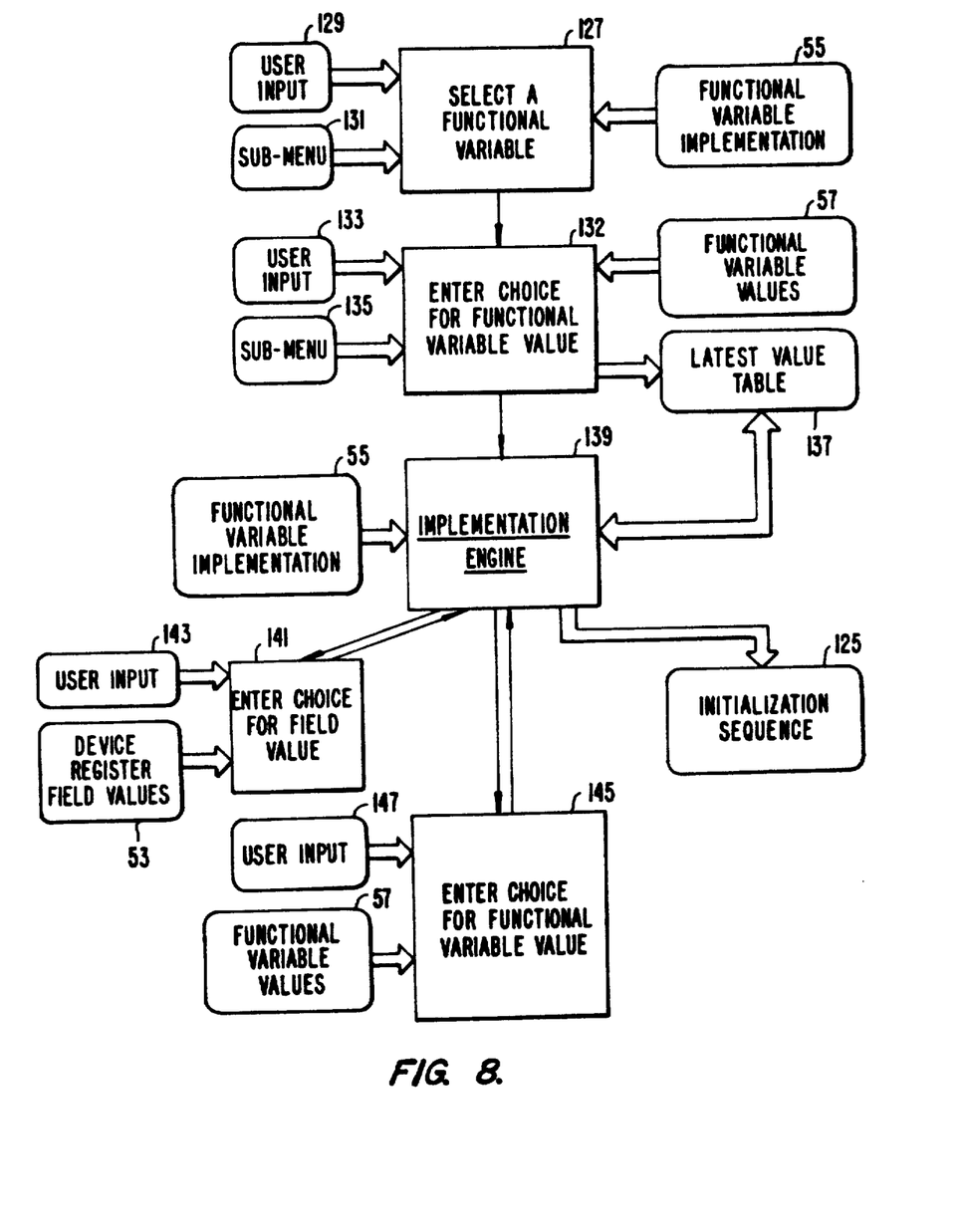
FIGS. 8, 9 and 10 show the processing of three different operations indicated in the diagram of FIG. 7.

Referring now to FIG. 8, the editing operation 109 of FIG. 7 is explained. The user has selected the option to utilize the high level functional variable in order to build initialization sequence 125. In doing so, a first operation 127 is for a user input 129, in response to a submenu 131, to select from the data file 55 one functional variable. The choices of functional variables for the part are, as explained previously with respect to FIG. 6, displayed in a column 89 of the window 87. Once that choice is made, one of the available functional variable values from the data file 57 is chosen by a user input 133 by selection from a submenu 135, which is given as the window 85 of the FIG. 6 display screen example. The result of that is to generally automatically add to a table 137 the single values which must exist for certain registers in order to carry out the designated function.

A next processing step 139 utilizes the function tree maintained within the data file 55 for the selected functional variable to prompt the user to make certain specific choices in order to carry out the designated function. As part of that tree, certain specific fields are presented to the user, as indicated by a block 141, one at a time with choices for that field being selected by the user, as indicated by 143. There can be several such choices, the functional variable tree within the data file 55 causing the processing 139 to follow a tree from field to field, dependent upon the user response to choices given. Additionally, a given tree may include another functional variable, as indicated by a block 145. A user's input 147 then selects a function of those presented in the screen, and this then leads, in the tree being implemented in the processing 139, to additional specific register fields and functional variables that present the user with choices. The complexity of various processing trees will vary considerably depending, of course, on the complexity of implementing any given chosen functional variable.

The functional variables selected to be included in data file 55 can be specific to a particular integrated circuit part or, preferably, can be general enough to apply to all parts which are similar. For instance, all serial communication parts require loading register fields to designate the width of the bus of the computer system in which they are used, the type of microprocessor with which they are used, a baud rate, and similar matters. It is this type of high level function that constitutes the functional variables and can thus easily be the same for different parts that operate similarly. Also, the functional variable values which provide the choices for the user to make may also be quite similar. In this way, users of such parts need not become so familiar with the specifics that differ among them.

Figure 9:
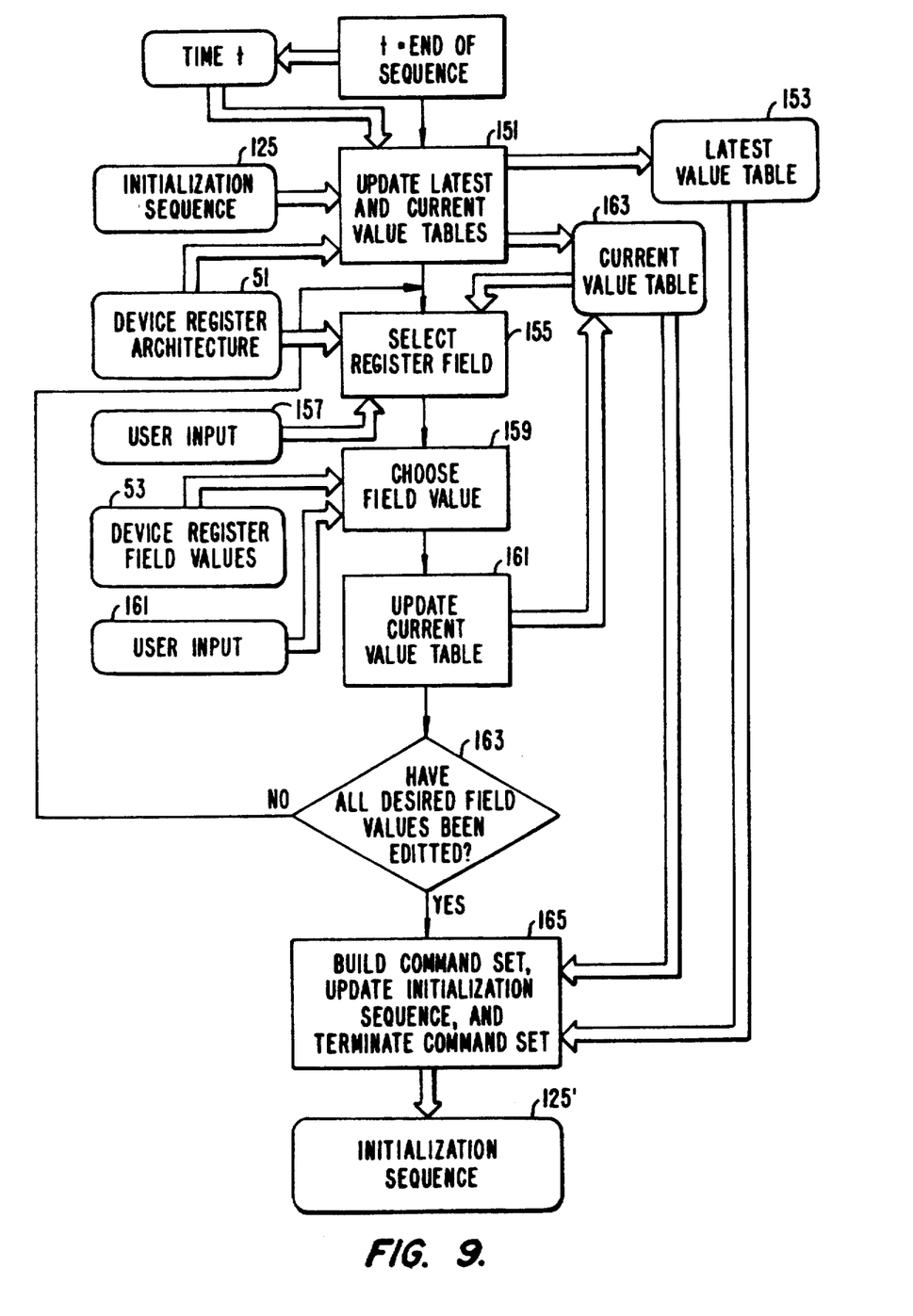

After all of the functional variables have been selected and their functional trees implemented in accordance with the processing illustrated in FIG. 8, a series of commands forming the initialization sequence 125 is the result. These commands designate that certain registers of the part are to be loaded in a certain sequence. However, it is often the case that one or more register fields need to be changed to some other value in the course of the part's initialization process. If so, the processing of FIG. 9, representing the editing operation 111 of FIG. 7, is utilized.

After execution of the sequence of FIG. 8, if the editing operation 111 of FIG. 7 is chosen, a step 151 takes the initialization sequence 125 and develops a table 153 that lists the values of all the register fields that have been set. The user is then able to select a register field, as indicated at 155, through the user input 157. This is done by the user in the window 71 of the display of FIG. 6. A processing step 159 then allows the user input 161 to select one of the values for that field that is displayed in the window 85 of FIG. 6. This value comes from the data listing 53. Once the user makes a choice, a processing step 161 then writes that register field choice into a current value table 163. The user continues to cycle through the sequence of processing steps 155, 159 and 161, until all the desired register fields have been updated, at which time, as indicated by a step 163, the processing proceeds to that indicated by a block 165.

In block 165, the processing compares the current value table 163, which has just been individually constructed one register field at a time by the user, with the latest value table 153, which is that which was constructed by the higher level functional variable selection process of FIG. 8. The main function of the processing step 165 is to then add commands to the initialization sequence 125, resulting in an initialization sequence 125'. The added commands occur after time t, at the end of the command sequence developed by the processing of FIG. 8. That is, when the part is actually initialized, its registers are first loaded with the values developed from the high level functional variables in accordance with FIG. 8 described above, and then at least some of them are later loaded with different values developed by the processing of FIG. 9.

Figure 10:
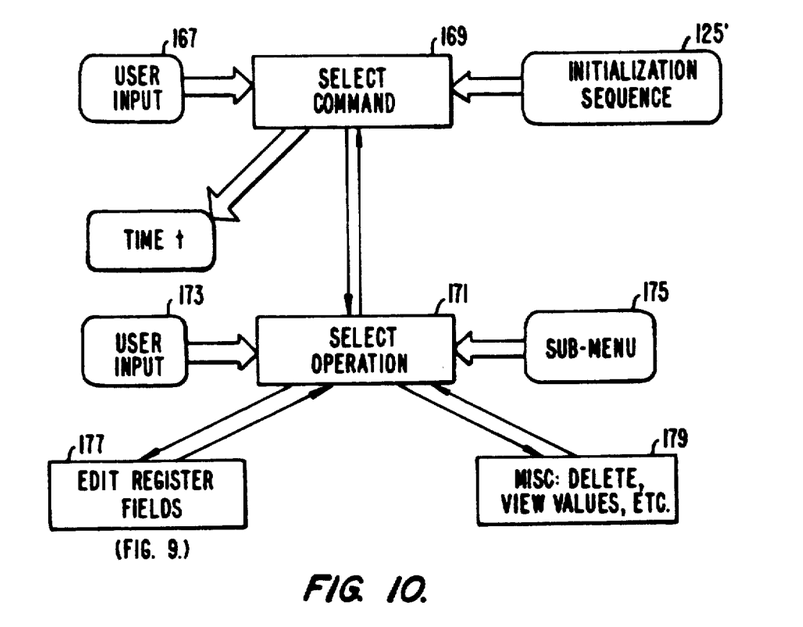

The processing option 113 (FIG. 7) allows the user to access individual commands within the initialization sequence 125' and edit them directly. This is shown in FIG. 10. If a user is sufficiently familiar with the part, an input 167 selects such a command, as indicated at 169, from the initialization sequence 125'. In a step 171, the user input 173 in response to a submenu 175, then selects one of several operations. One such operation 177 allows individual register fields to be edited one at a time. This follows the processing described with respect to FIG. 9, beginning at the processing step 151. Other operations 179 that are possible include deleting commands, viewing their values, etcetera.

An example of computer software to implement the foregoing is given in a source code listing in the C language that is being filed herewith in microfiche form. Also included are input data files for the Universal Serial Controller integrated circuit part available from Zilog, Inc., previously referenced. This software and data listings are copyrighted by Zilog, Inc., assignee of the present application.

Although the various aspects of the present invention have been described with respect to its preferred embodiments, it will be understood that the invention is entitled to protection within the full scope of the appended claims.

It is claimed:

1. A method of utilizing an integrated circuit having a plurality of operable registers storing bit fields that control various aspects of operation of the circuit, comprising the steps of:

storing a table in a programming computer system memory which identifies alternative valid bit patterns of said fields and descriptors of alternative operational control of the integrated circuit provided thereby, providing for an operator of the programming computer system to form a command file in its said system memory as the result of selecting from said table a combination of register field bit patterns that, when loaded into the integrated circuit registers, cause said integrated circuit to perform with desired functions as part of an operating computer system, generating from said programming computer command file an operating program to initialize the integrated circuit by loading its said plurality of operable registers, running said operating program in the operating computer system including said integrated circuit, thereby to load said integrated circuit operable registers with the selected field bit patterns, and operating the computer system with the loaded integrated circuit as part thereof.

2. The method according to claim 1 wherein the step of providing for an operator of the programming computer system to form a command file includes the steps of displaying on a monitor of the programming computer system at least the descriptors of valid alternatives of at least one field at a time, and responding to selection of a highlighted one of the alternatives of said at least one field to store in said command file a bit pattern corresponding thereto.

3. The method according to claim 1 wherein the step of providing for an operator of the programming computer system to form a command file includes the steps of receiving a specific bit pattern for a field that is input from an operator of the programming computer system, and accessing the bit pattern table to provide a display of the descriptor corresponding to the inputed field bit pattern.

4. The method according to claim 1 wherein the step of providing for an operator of the programming computer system to form a command file includes the steps of listing on said programming computer system display various alternative functions that can be performed by the integrated circuit, providing for the operator of the programming computer system to select among the alternative functions, and accessing specified field bit patterns of said table in response to the functions selected by the operator.

5. The method according to claim 4 wherein the table accessing step includes the step of accessing in sequence a plurality of specified field bit patterns in response to selection of each of at least some of the alternative functions.

6. The method according to claim 4 wherein the table accessing step includes the step of displaying on said programming computer system monitor at least the descriptors of valid alternatives of at least one of said specified fields at a time, and responding to selection of a highlighted one of the alternatives of said at least one field to store in said command file a bit pattern corresponding thereto.

7. The method according to claim 1 wherein the bit pattern table storing step includes the step of including information of those register fields which require the value of another register to be a certain bit pattern before those register fields are accessible, and wherein the step of providing for an operator of the programming computer system to form a command file includes the step of disabling selection of a bit value for fields which are indicated to be inaccessible from information of said table and a bit value earlier selected for another field.

8. A method of utilizing an integrated circuit having a plurality of operable registers storing bit fields that control various aspects of operation of the circuit, comprising the steps of:
    storing a first table in a programming computer system memory which identifies alternative valid bit patterns of said fields and descriptors of alternative operational control of the integrated circuit provided thereby,
    storing a second table in said programming computer system memory that identifies alternative functions that can be performed by a class of circuits of which said integrated circuit is a part,
    defining those of the operable registers whose loaded bit pattern affects whether various of the alternative functions of said second table can be carried out by said integrated circuit,
    providing for an operator of the programming computer system to select from the alternative valid bit patterns for the operable registers so defined,
    forming a command file in said programming computer system memory from the selected register bit patterns,
    generating from said programming computer command file an operating program to initialize the integrated circuit by loading its said plurality of operable registers, and
    running said operating program in the operating computer system including said integrated circuit, thereby to load said integrated circuit operable registers with the selected bit patterns.

9. In a programming computer system containing a central processing unit, a memory, a display and an input device, a configuration thereof having particular application for defining the contents of control register fields within a specific integrated circuit contemplated for use within a given operating computer system, comprising:
    a first table residing in said memory which identifies alternative valid bit patterns of said control register fields and descriptors of alternative operational control of the integrated circuit provided thereby,
    means responsive to said first table for displaying on said display the descriptors of alternative bit pattern choices of at least one register field,
    means responsive to an operator selection through the input device of one of the descriptors of said at least one register field for recording in said memory as part of a second table the bit pattern specified by the first table to correspond to the selected descriptor of said at least one register field,
    a third table residing in said memory which provides a plurality of alternative general operational functions that the specific integrated circuit is capable of carrying out,
    means responsive to said third table for displaying the alternative general operational functions on said display,
    means responsive to an operator selection through the input device of an alternative one of the general operational functions for causing said descriptors display means to provide descriptors of alternative bit pattern choices for one or more register fields specified as necessary to be made in order to carry out the selected one individual general operational function, whereby said recording means adds the bit pattern value for a selected field to said second table, and
    means responsive to the second memory table for configuring its register field values in a form to be loaded into the registers of said specific integrated circuit.

* * * * *